US011755721B2

(12) United States Patent
Nunez Mencias et al.

(10) Patent No.: US 11,755,721 B2
(45) Date of Patent: Sep. 12, 2023

(54) TRUSTED WORKLOAD EXECUTION

(71) Applicant: International Business Machines Corporation, Armonk, NY (US)

(72) Inventors: Angel Nunez Mencias, Stuttgart (DE); Nicolas Maeding, Holzgerlingen (DE); Peter Morjan, Boeblingen (DE); Dirk Herrendoerfer, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 17/509,164

(22) Filed: Oct. 25, 2021

(65) Prior Publication Data

US 2023/0128099 A1    Apr. 27, 2023

(51) Int. Cl.
*G06F 21/00* (2013.01)
*G06F 21/53* (2013.01)

(52) U.S. Cl.
CPC ........ *G06F 21/53* (2013.01); *G06F 2221/033* (2013.01)

(58) Field of Classification Search
CPC ............................ G06F 21/53; G06F 2221/033
See application file for complete search history.

(56) References Cited

U.S. PATENT DOCUMENTS

| 10,031,993 | B1 | 7/2018 | Poornachandran |
| 11,537,283 | B2 | 12/2022 | Gonzalez |
| 2003/0084056 | A1 | 5/2003 | DeAnna |
| 2012/0266231 | A1* | 10/2012 | Spiers ............... H04L 9/3234 726/12 |
| 2013/0232463 | A1 | 9/2013 | Nagaraja |
| 2014/0007222 | A1 | 1/2014 | Qureshi |
| 2015/0096011 | A1 | 4/2015 | Watt |
| 2016/0234625 | A1 | 8/2016 | Wang |
| 2017/0168777 | A1 | 6/2017 | Britt |

(Continued)

FOREIGN PATENT DOCUMENTS

| CN | 103440436 A | 12/2013 |
| CN | 106605233 A | 4/2017 |

(Continued)

OTHER PUBLICATIONS

IBM, "List of IBM Patents or Patent Applications Treated as Related", Appendix P, 2 pages, dated Oct. 26, 2021.

(Continued)

*Primary Examiner* — Ghazal B Shehni
(74) *Attorney, Agent, or Firm* — Willam H. Hartwell; Jared L. Montanaro

(57) ABSTRACT

The present disclosure relates to a computer implemented method for executing an application. The method comprises: executing a bootloader in a trusted execution environment, wherein the executing comprises: decrypting received encrypted secrets using decryption keys of the boot loader, storing the decrypted secrets in a storage accessible by the application, creating a proof record indicating the application, the secrets and the trusted execution environment, storing the proof record in the storage, and deleting the decryption keys. The application may be executed in the trusted execution environment using the decrypted secrets. The proof record may be provided by the application for proving authenticity.

20 Claims, 5 Drawing Sheets

(56) References Cited

U.S. PATENT DOCUMENTS

| | | |
|---|---|---|
| 2017/0230179 A1 | 8/2017 | Mannan |
| 2017/0351868 A1 | 12/2017 | Jacob |
| 2018/0329693 A1 | 11/2018 | Eksten |
| 2019/0319807 A1* | 10/2019 | Fairfax ............... H04L 63/0823 |
| 2020/0210585 A1 | 7/2020 | Thom |
| 2020/0252207 A1 | 8/2020 | Hanel |
| 2020/0394120 A1 | 12/2020 | Fathi Salmi |
| 2021/0006402 A1 | 1/2021 | Ohms |
| 2021/0042148 A1 | 2/2021 | Alford |
| 2021/0117242 A1 | 4/2021 | Van De Groenendaal |

FOREIGN PATENT DOCUMENTS

| | | |
|---|---|---|
| CN | 110519260 A | 11/2019 |
| WO | 2020231952 A1 | 11/2020 |

OTHER PUBLICATIONS

Maeding et al., "Building and Deploying an Application", U.S. Appl. No. 17/509,169, filed Oct. 25, 2021, 33 pages.

Authors et. al.: Disclosed Anonymously, "Fully Decentralized Cloud Using Generalized Trusted Execution Environments and Distributed Hash Tables (Without Blockchain)", An IP.com Prior Art Database Technical Disclosure, IP.com No. IPCOM000264923D, IP.com Electronic Publication Date: Feb. 5, 2021, 7 pages.

Mell et al., "The NIST Definition of Cloud Computing", Recommendations of the National Institute of Standards and Technology, Special Publication 800-145, Sep. 2011, 7 pages.

"Patent Cooperation Treaty PCT Notification of Transmittal of the International Search Report and the Written Opinion of the International Searching Authority, or the Declaration", International application No. PCT/IB2022/059697, International filing date Oct. 10, 2022, dated Oct. 25, 2021, 8 pages.

* cited by examiner

TRUSTED WORKLOAD EXECUTION

BACKGROUND

The present invention relates to the field of digital computer systems, and more specifically, to executing an application.

In cloud environments, physical resources may be shared by virtual machines owned by different cloud consumers. For that, hypervisors used in the cloud may offer rich interfaces that are exposed to cloud customers; however, vulnerabilities in their security models may lead to unauthorized access to these shared resources and customer information. Attackers may be able to manipulate assets belonging to the cloud and provoke denial of service, data leakage, data compromise, and direct financial damage for users/customers of such cloud infrastructure.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for executing an application. The method comprises: receiving encrypted secrets of the application; executing a bootloader in a trusted execution environment of a host computer system, the executing comprising: decrypting the received encrypted secrets using decryption keys of the boot loader; storing the decrypted secrets in a storage accessible by the application; creating a proof record indicating the application, the secrets and the trusted execution environment; storing the proof record in the storage; deleting the decryption keys; executing the application in the trusted execution environment using the decrypted secrets; and providing the proof record by the application (e.g., for proving authenticity).

In another aspect, the invention relates to a computer program product comprising a computer-readable storage medium having computer-readable program code embodied therewith, the computer-readable program code configured to implement all of the steps of the method according to preceding embodiments.

In another aspect, the invention relates to a computer system comprising a trusted execution environment. The computer system is configured for: receiving encrypted secrets of an application; executing a bootloader in the trusted execution environment, the executing comprising: decrypting the received encrypted secrets using decryption keys of the boot loader; storing the decrypted secrets in a storage accessible by the application; creating a proof record indicating the application, the secrets and the trusted execution environment; storing the proof record in the storage accessible by the application; deleting the decryption keys; executing the application in the trusted execution environment using the decrypted secrets; and providing the proof record by the application (e.g., for proving authenticity).

DETAILED DESCRIPTION

Figure 1:
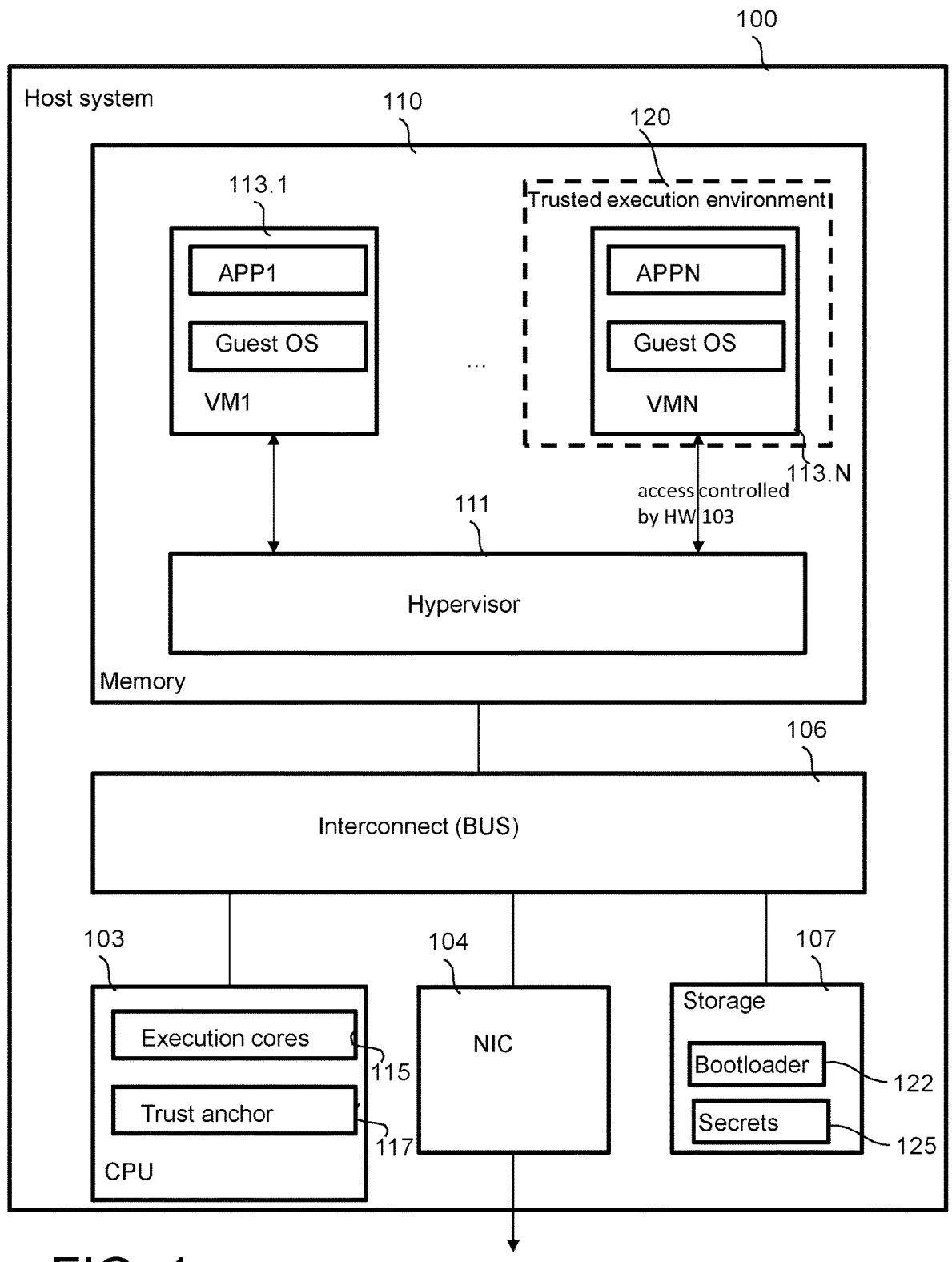
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Developing an application for processing sensitive data may be a challenging task if security becomes an issue. The present subject matter may provide a secure execution of an application in a trusted and isolated execution environment of a host computer system and by attesting to a user the processing of the application in the trusted execution environment. The host computer system may, for example, be part of a cloud environment, which may be considered an untrusted environment. The host computer system may implement multiple execution environments using hardware, software, or a combination of both for managing, processing, and/or storage of assets. An execution environment may be a collection of hardware and/or software components that defines a computing configuration. Each execution environment has certain resources available to the particular execution environment for storage and execution of assets. The trusted execution environment (TEE) may be an example of an execution environment. The trusted execution environment may be implemented so that its execution and data space are isolated from other environments executing code on the host computer system. For example, the trusted execution environment may have dedicated or protected processing and system resources, such as secure storage and protected memory buffers. For example, the TEE may be embodied as a virtual machine managed using (IBM) Secure Execution for Linux or Secure Encrypted Virtualization (SEV) technology. (Note: the term(s) "IBM" and/or "LINUX" may be subject to trademark rights in various jurisdictions throughout the world and are used here only in reference to the products or services properly denominated by the marks to the extent that such trademark rights may exist.) A virtual machine (VM) may be a software implementation of a computer that executes computer programs as if it were a standalone physical machine. A user may initiate creation of the VM e.g., within the cloud environment for execution of the application. The user may request that the host computer system instantiates a new instance of a VM that may be completely empty without any executable code, in which case the executable code such as, for example, the bootloader, may be supplied. The VM may then start executing instructions specified in the bootloader. The bootloader may include instructions informing the VM of how the VM is to operate and may, for example, facilitate loading of a guest operating system. The guest operating system may be given the control by the bootloader so that the guest operating system may in turn load the application, if it is not loaded by the bootloader, into the memory of the VM and trigger execution of the application. The bootloader may, for example, comprise the guest operating system itself, the application or both.

In addition, the present subject matter provides a secure handling of configuration data of the application. For that, secrets of the application are encrypted and decrypted in a secure manner. A secret refers to any type of data that the application does not want to make publicly available, such as an encryption key, a user password, a password to access a remote computing device, and so forth. The secret may provide a method to include sensitive configuration information, such as passwords, TLS keys or SSH keys, to the process of the application. By referencing values from the secret, one can decouple sensitive information from the deployment to keep the application portable. For example, the secrets may contain information in key-value pairs so that they can be mapped to environment variables. When mapped to environment variables, the NAME=VALUE relationships are set such that the name of the environment variable corresponds to the "key" of each entry in those maps, and the value of the environment variable is the "value" of that key.

The term "application" or computer application or workload in context of the invention can relate to any computer program or plurality of computer programs providing particular functionality. For example, a computer application can be a web server application, a database server application providing database management services and databases, etc.

For example, a method for attesting to a user the processing of workload in a trusted execution environment (TEE) comprises the steps: providing a trusted bootloader built inside said TEE, wherein said trusted bootloader is encrypted so it can only run within said TEE, combining said trusted bootloader with said workload by means of downloading said workload at runtime and packaging it together with said bootloader at build time, said bootloader taking as input a user-provided nonce and together with a workload hash and workload parameters hashes producing a signed proof-record to prove authenticity using its signing secret, said bootloader decrypting encrypted secrets passed to said workload using one of its decrypting secrets, deleting one or more of said secrets in said bootloader before starting processing said workload, said bootloader starting processing said workload and passing said proof-record and said decrypted secrets to said user, to prove it was started by said trusted bootloader in said TEE.

According to one embodiment, the trusted execution environment comprises one or more virtual machines of the host computer system, wherein the host computer system is configured to protect memory data of the one or more virtual machines. The memory data that is part of the main memory of the host computer system may, for example, be protected by encrypting it. The keys involved in these encryptions may be managed so that only said one or more VMs may access them while other VMs or hypervisors may not access the keys.

For example, the SEV technology may be used to protect the virtual machine by transparently encrypting the memory of the VM with a unique key. The SEV technology encrypts the memory of the VMs with distinct keys, so that they are not only protected against physical threats, but also against other VMs and the hypervisor. The processor of the host computer system may be responsible for the key management and the cryptographic operations. A hypervisor may interact with the processor by a secure key management interface. The keys may not be accessible by the hypervisor.

According to one embodiment, the method further comprises defining the trusted execution environment, which includes: invoking a hypervisor or any other component of the host computer system that can create and run VMs, assigning by the hypervisor resources for a virtual machine in the host computer system, starting the virtual machine, and loading by the bootloader a guest operating system into the virtual machine, wherein the trusted execution environment is the virtual machine. The guest operating system may be given the control by the bootloader so that the guest operating system may in turn load the application, if it is not loaded by the bootloader, into the memory of the VM and trigger execution of the application.

According to one embodiment, the bootloader is encrypted, wherein executing the bootloader includes decrypting the bootloader by the host computer system. In one example, the hypervisor may decrypt the bootloader. In another example, a hardware component such as an anchor of the CPU of the host computer system may decrypt the bootloader. The bootloader may be stored on disk in encrypted format so that it can only run in the trusted execution environment which has access to the keys.

According to one embodiment, the bootloader is decrypted using a decryption key that is not accessible by the bootloader.

According to one embodiment, the execution of the bootloader comprises: receiving a nonce; wherein the proof record comprises the nonce, a hash value of the secrets, a hash value of the application, application parameters and data indicative of the trusted execution environment. The hash values may, for example, be generated using predefined hash functions. Data indicative of the trusted execution environment may, for example comprise a hash value of the VM(s) of the trusted execution environment.

According to one embodiment, the decryption keys are embedded in the bootloader, wherein the end of the execution of the boot loader results in the deletion of the decryption keys.

According to one embodiment, the application is encrypted, wherein decrypting the secrets further comprises decrypting the application by the bootloader.

According to one embodiment, the execution of the bootloader comprises randomly selecting a value of a specific parameter of the application or of the TEE which is specific for a current execution of the application or of the TEE. According to one embodiment, the method further comprises repeating the method for other received secrets of the application.

According to one embodiment, the method further comprises signing, by the bootloader, the proof record with a prestored signing key.

According to one embodiment, executing the bootloader further comprises loading the application into a memory of the host computer system by the bootloader. The loading of the application may occur at runtime.

According to one embodiment, the storage used to store the decrypted secrets and the proof record is a memory or filesystem of the host computer system.

FIG. 1 is a block diagram of a computer system (also referred to herein as host system or host computer system) 100 in accordance with an example of the present subject matter.

The host system 100 may include hardware computing components connected by one or more interconnects 106. The host system 100 may include network interface cards (NICs) 104, a memory 110, CPU(s) 103, and a storage device 107 (e.g., a locally attached disk drive, solid-state device (SSD), or a connection to remote storage such as a SAN). For example, as shown, CPU 103 may include one or more execution cores 115. The host system 100 may be configured to execute applications APP1-APPN using virtual machines 113.1-113.N. The storage device 107 may comprise a bootloader 122 that may be used to configure and start at least part of the applications APP1-APPN. Part of or all of the applications such as the application APPN may, for example, require that some of their data is not publicly available by using secrets that protect such data. The protected data may, for example, comprise an encryption key, a user password, a password to access a remote computing device etc. These secrets of the application APPN may, for example, be received in encrypted format from a user of the application APPN. As shown in FIG. 1, the encrypted secrets 125 are stored in the storage 107. The secrets 125 may be encrypted with an asymmetric encryption technique where the user has used the public key to encrypt the secrets. The bootloader 122 may be embodied with the private keys. In one example, the bootloader 122 may be stored in encrypted format.

As shown in FIG. 1, the memory 110 may include a hypervisor 111. The hypervisor 111 may, for example, be implemented as a software layer that runs directly on the computing hardware of the host system 100 or may be implemented as part of a host OS of the host system 100. The hypervisor 111 may be configured to provide virtualized hardware elements for each virtual machine 113.1-113.N. The hypervisor 111 may instantiate any number of Virtual Machines (VMs). As shown in FIG. 1, the hypervisor 111 may instantiate VM instances 113.1-N. For each VM, the hypervisor 111 may allocate a chunk of memory and other resources e.g., each VM 113.1-N provides a virtualized computing platform with a virtual CPU, memory, storage, and networking interfaces. After being defined or created, the VMs 113.1-N may be initiated or booted using, for example, the bootloader 122. FIG. 1 shows, for example, the VMs 113.1-N after being booted. Each of the VMs 113.1-N comprises a guest operating system and the application that is to be executed on the VMs. Distinct VMs 113.1-N may, for example, be executed on different execution cores 115.

The host system 100 may be used to define a trusted execution environment 120 in accordance the present subject matter. The trusted execution environment 120 may be implemented with one or more virtual machines to provide isolation from applications e.g., APP1 running in other execution environments. Assume for simplification of the description that the trusted execution environment 120 is implemented by the VM 113.N. This may enable a secure execution of the application APPN in the trusted execution environment. The isolation may, for example, be enabled by a trust anchor 117 of the CPU 103. The trusted anchor 117 may, for example, protect read/write accesses by the VM 113.N of the trusted execution environment 120. For enabling the trusted execution environment, the trusted anchor 117 may protect any data of information like state of the VM 113.N to be exposed outside of the CPU 103 or to any other VM or device such as the NIC 104, interconnect 106 and storage 107. This may, for example, prevent a VM executing on one execution core from accessing data belonging to another VM executing on a different execution core. The trust anchor 117 may provide the ability to decrypt the bootloader 122, in case it is provided in encrypted form, without exposing it unprotected by any means except during execution in the execution cores 115. For example, the bootloader may reside in encrypted format in the memory while the decryption only occurs by the trust anchor 117 locally within the processor 103.

Figure 2:
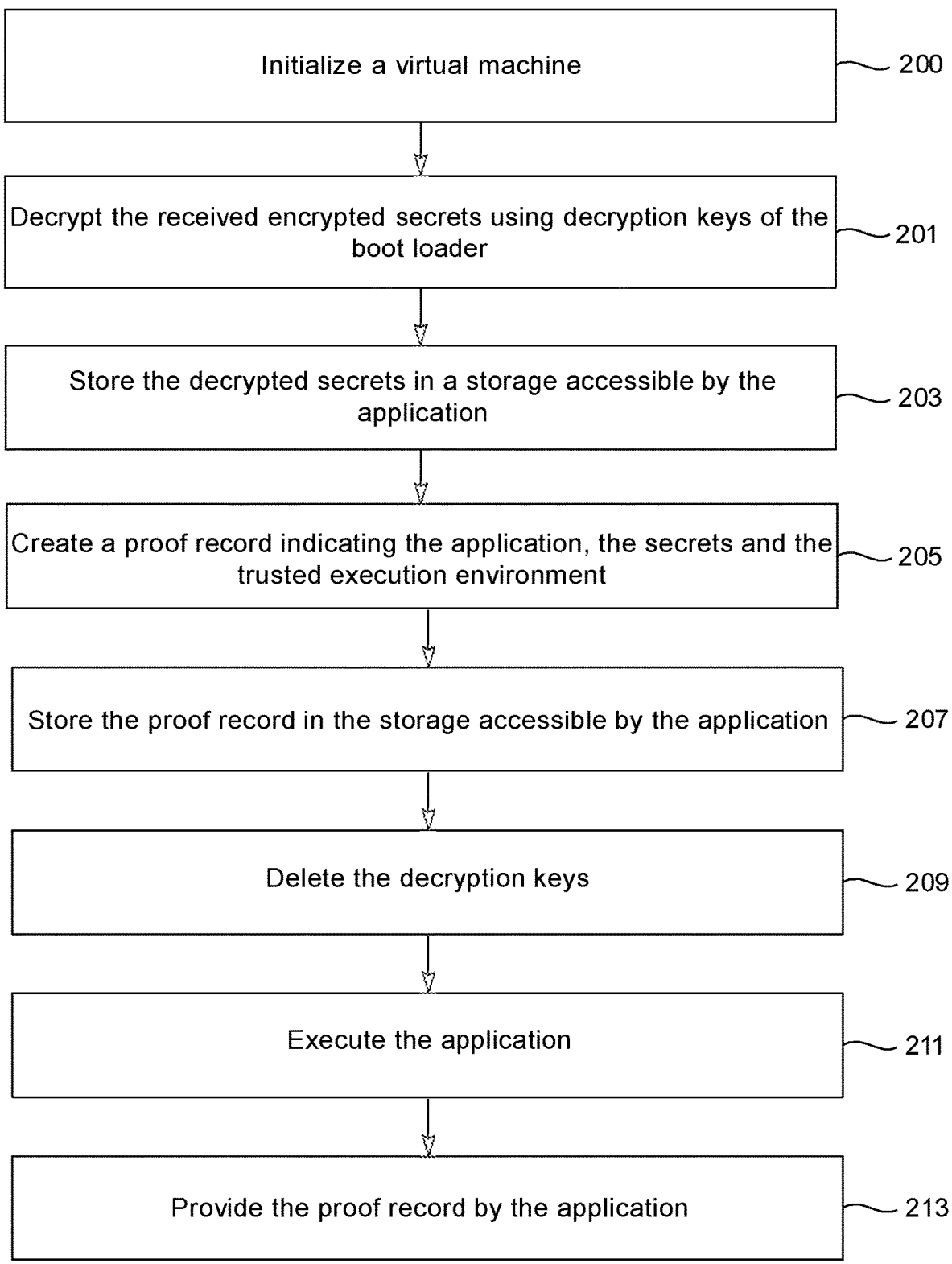
FIG. 2 is a flowchart of a method for executing an application in accordance with an example of the present subject matter.

FIG. 2 is a flowchart of a method for executing an application in accordance with an example of the present subject matter. For the purpose of explanation, the method described in FIG. 2 may be implemented in the system illustrated in FIG. 1, but is not limited to this implementation. The method of FIG. 2 may, for example, be performed to execute the application APPN.

After creating the VM 113.N by the hypervisor 111, trust anchor 117 may copy or map the bootloader 122 into the partition's memory space and then jumps to or gives control to the bootloader 122. The bootloader 122 is then executed to initialize the VM of the trusted execution environment 120 and load in step 200 the guest operating system into the VM 113.N. The bootloader may include instructions informing the VM of how the VM is to operate and may, for example, facilitate loading of the guest operating system. The bootloader 122 may be the guest operating system itself, may include the application APPN, or both.

The encrypted secrets 125 may be decrypted in step 201 by the bootloader 122. For example, the bootloader 122 may use the embodied private keys to decrypt the secrets. In one example, the bootloader 122 may optionally use a randomization technique in order to distinguish/personalize the different instances of the application APPN, which may be particularly advantageous if the application is executed multiple times. The bootloader 122 may, for example, choose different values of a specific parameter of the application APPN for different instances. The specific parameter may, for example, comprise at least one of encryption key used by the application, attached storage identifier, and instance name. An attached storage identifier identifies one or more storage entities attached to an application. For that, the bootloader may randomly select the value of the specific parameter for the current instance of the application APPN. Random value selection for the parameters may enable, for example, personalizing a given instance of the running application APPN by randomizing of encryption keys for the storage access and/or re-encryption. The decrypted secrets may be stored in step 203 in a storage, e.g., memory 110, accessible by the application APPN. A proof record may be created in step 205. The proof record comprises an indication of the application APPN, the secrets and the trusted execution environment 120 where the application APPN is to be executed. The proof record may be stored in step 207 in that storage accessible by the application APPN. After storage of the proof record, the execution of the bootloader may end resulting in the deletion of the private keys in step 209. This may prevent the application APPN from stealing or leaking such keys. The bootloader process completes and, as a last step, gives the control to the application APPN via the guest operating system, so that the application APPN may become the only process running. The application APPN may be executed in step 211 using the secrets that have been stored in the storage accessible by the application APPN. The application APPN may provide in step 213 the proof record to the user (e.g., for proving authenticity).

The method of FIG. 2 may define what is done in the bootloader while the guest operating system is loaded and prior to giving the workload control over the guest operating system (as the bootloader completes its work). In one example, steps 201 to 213 may be repeated multiple times such that in each repetition a different set of encrypted secrets is used to execute the application APPN.

Figure 3:
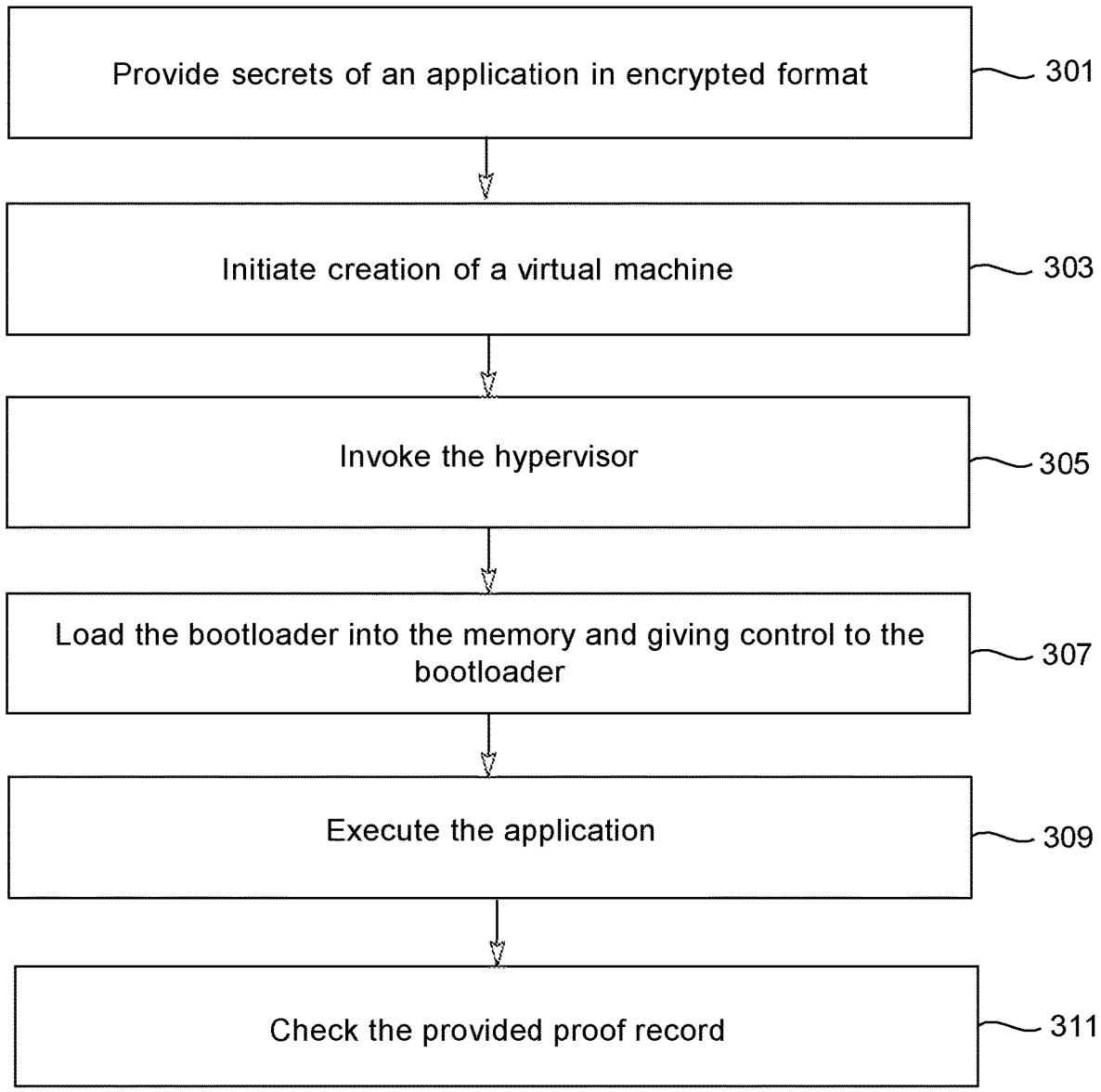
FIG. 3 is a flowchart of a method for executing an application in accordance with an example of the present subject matter.

FIG. 3 is a flowchart of a method for executing an application in accordance with an example of the present subject matter. For the purpose of explanation, the method described in FIG. 3 may be implemented in the system illustrated in FIG. 1, but is not limited to this implementation. The method of FIG. 3 may, for example, be performed to execute the application APPN.

A user may select the application APPN for execution. The user may encrypt the secrets required by the application APPN. The secrets may for example be encrypted using public keys of the bootloader provider. The user may then provide the encrypted secrets to the host system 100 in step 301. The term "user" may refer to an entity e.g., an individual, a computer, or an application executing on a computer.

The user may initiate in step 303 creation of a VM within, but not limited to, the cloud environment for execution of the application APPN. The user may, for example, request that the VM defines a trusted execution environment within the host system 100. In response to the request, the hypervisor may be invoked in step 305 in order to create the VM by allocating resources to the VM in the host system 100. The bootloader may load the guest operating system. The hypervisor may instantiate a new instance of a VM that may be completely empty without any executable code. After creating the VM, the hypervisor may copy the bootloader 122 into the partition's memory space and then give control to the bootloader 122 in step 307. Step 309 includes executing the application; in at least some embodiments, step 309 encompasses steps 201-213 as described with respect to FIG. 2. The user may check the proof record in step 311. A failing check may indicate that the application APPN has been changed or compromised, is either not running in the expected trusted execution environment or not using an expected/approved bootloader. The action to take depends on the user that verifies the proof record. For example, if it fails then the workload should not be considered to run in a trustworthy environment, and neither be further used nor assumed trustworthy.

Figure 4:
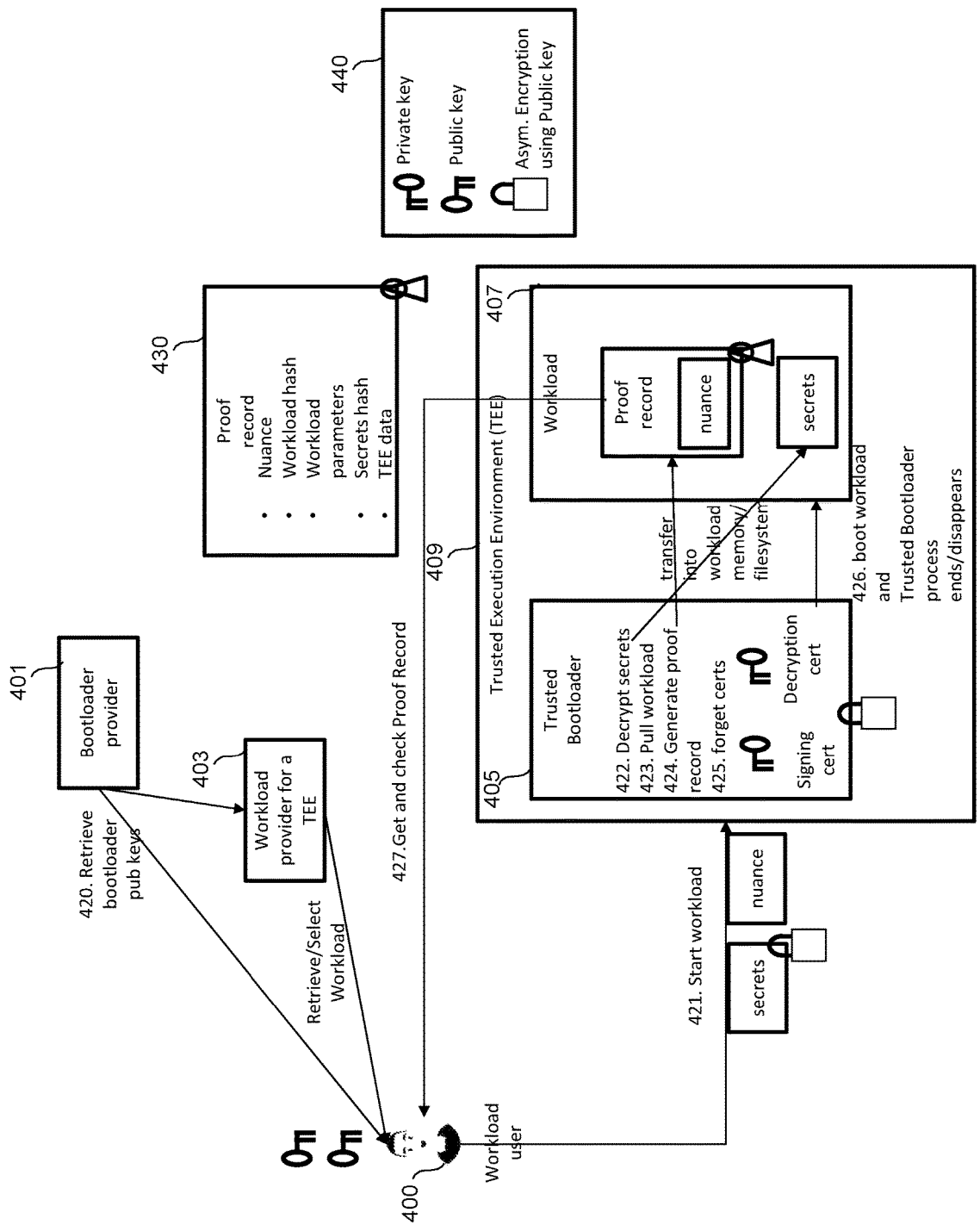
FIG. 4 is a diagram illustrating a method for executing a workload in accordance with an example of the present subject matter.

FIG. 4 is a diagram illustrating a method for executing a workload in accordance with an example of the present subject matter.

A workload user 400 may retrieve (step 420) the bootloader public keys from the bootloader provider 401 and may select the workload to be executed. The workload 407 may be provided by the workload provider 403. The trusted bootloader 405 may be combined with the workload 407 by mean of downloading the workload at runtime or by being packaged together at build time. The user 400 may start (step 421) the workload by sending the encrypted secrets and a nuance. The secrets are encrypted by the retrieved public keys. The bootloader decrypts (422) encrypted secrets passed to the workload using one of its decrypting certs. The bootloader decrypts (422) the secrets for the workload with an own embedded cert that is dropped towards preventing the workload, admin or the user from leaking the keys. The bootloader 405 pulls (423) the workload into memory in case the workload is not packaged together with the bootloader 405. The bootloader 405 takes as input the user provider nuance and, together with the workload hash and workload parameters hashes, it produces (424) a signed proof-record 430 to prove authenticity using its signing cert. The bootloader forgets (425) one or more of its keys before starting the workload 407, which prevents the workload to steal/leak such keys. The bootloader 405 starts (426) the workload 407 and passes the proof-record and the decrypted user secrets. The workload 407 presents (427) to the user 400 its proof-record 430 to prove it was stated by the trusted bootloader 405 in the required TEE 409. Thus, the trusted bootloader running in the TEE may be capable of proving authenticity of the started workload by mean of a challenge and response during boot and the embedded cert that are forgotten before starting such a workload. Legend 440 is a key depicting symbology for the private key, public key, and asymmetric encryption using the public key.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
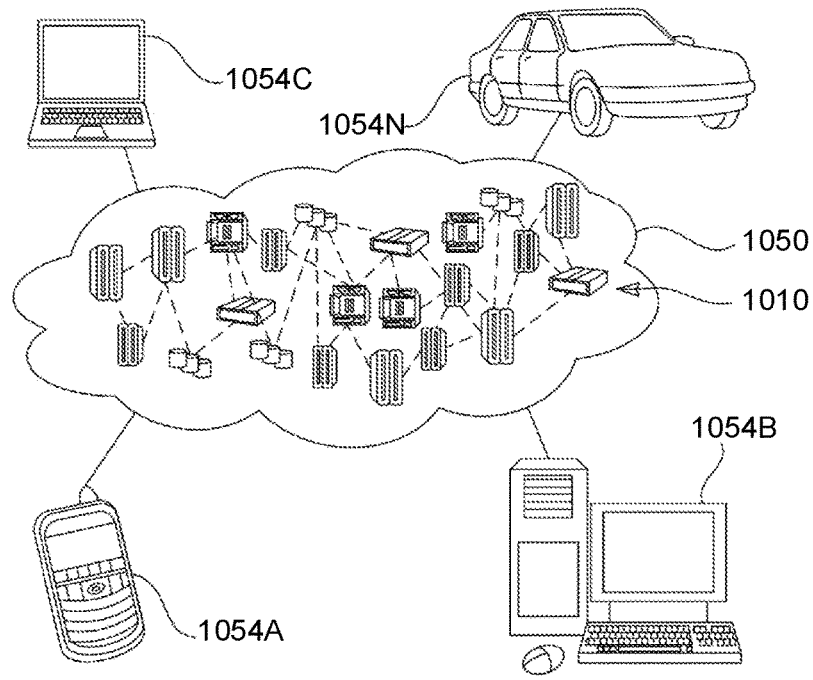
FIG. 5 depicts a cloud computing environment according to an embodiment of the present invention.

Referring now to FIG. 5, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

Figure 6:
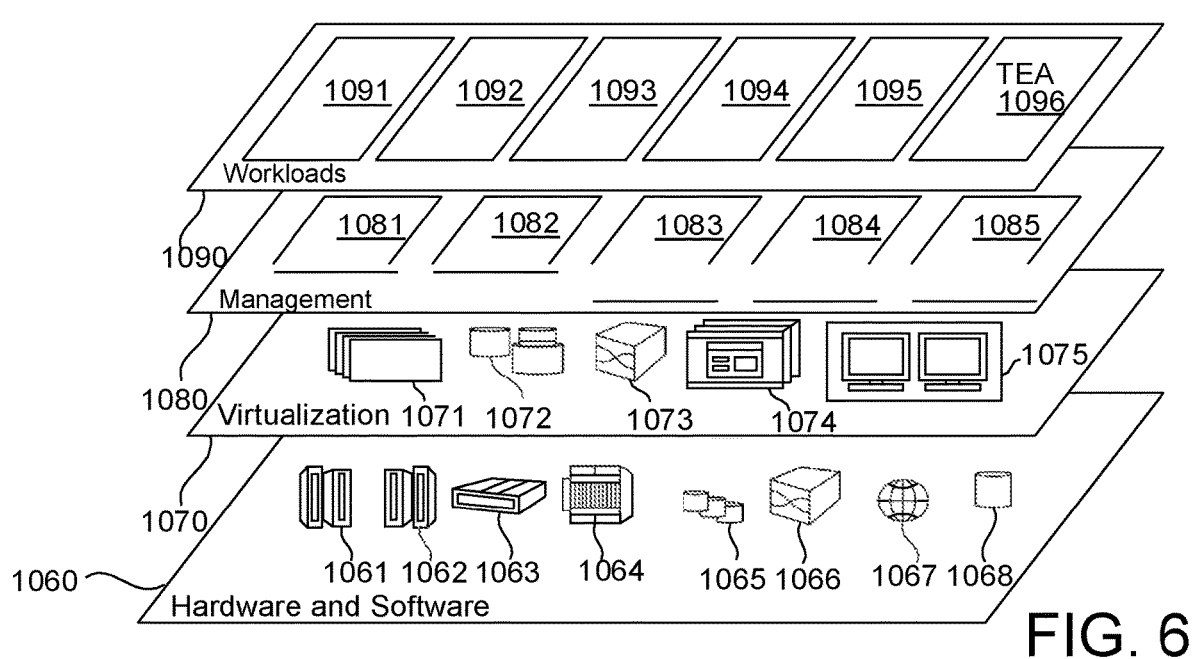
FIG. 6 depicts abstraction model layers according to an embodiment of the present invention.

Referring now to FIG. 6, a set of functional abstraction layers provided by cloud computing environment 1050 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA. In one example, the management layer 1080 may provide at least part of the present method e.g., the management layer 1080 may provide the method of FIG. 2, 3 or 4.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and trusted execution of an application (TEA) 1096 in accordance with the present subject matter e.g., as described with reference to FIG. 2, 3 or 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
    receiving encrypted secrets, the received encrypted secrets enabling access to resources by an application; and
    executing a bootloader in a trusted execution environment of a host computer system, the executing comprising:
        decrypting the received encrypted secrets using decryption keys of the bootloader;
        storing the decrypted secrets in a storage accessible by the application;
        creating a proof record indicating the application, the decrypted secrets and the trusted execution environment;
        storing the proof record in the storage;
        deleting the decryption keys;

executing the application in the trusted execution environment using the decrypted secrets; and providing the proof record by the application for proving authenticity.

2. The computer implemented method of claim 1, wherein the trusted execution environment comprises one or more virtual machines of the host computer system, wherein the host computer system is configured to protect memory data of the one or more virtual machines.

3. The computer implemented method of claim 1, further comprising:

invoking a hypervisor of the host computer system;

assigning by the hypervisor resources for a virtual machine in the host computer system;

starting the virtual machine; and loading by the bootloader a guest operating system into the virtual machine, wherein the trusted execution environment is the virtual machine.

4. The computer implemented method of claim 3, wherein the bootloader is encrypted, and wherein executing the bootloader comprises decrypting the bootloader by the host computer system.

5. The computer implemented method of claim 4, wherein the bootloader is decrypted using a decryption key that is not accessible by the bootloader.

6. The computer implemented method of claim 1, wherein receiving the secrets comprises receiving a nonce, wherein the proof record comprises the nonce, a hash value of the secrets, a hash value of the application, application parameters and data indicative of the trusted execution environment.

7. The computer implemented method of claim 1, the decryption keys being embedded in the bootloader, wherein the end of the execution of the bootloader results in the deletion of the decryption keys.

8. The computer implemented method of claim 1, wherein the application is encrypted, and wherein decrypting the secrets further comprises decrypting the application by the bootloader.

9. The computer implemented method of claim 1, further comprising signing by the bootloader the proof record with a prestored signing key.

10. The computer implemented method of claim 1, wherein executing the bootloader further comprises loading the application into a memory of the host computer system by the bootloader.

11. The computer implemented method of claim 1, wherein the storage is a memory or filesystem.

12. The computer implemented method of claim 1, wherein the execution of the bootloader comprises randomly selecting a value of a specific parameter of the application specific for the current execution of the application.

13. A computer program product comprising:

one or more computer readable storage media and program instructions stored on the one or more computer readable storage media, the program instructions comprising instructions to:

receive encrypted secrets, the encrypted secrets enabling access to resources by an application; and execute a bootloader in a trusted execution environment of a host computer system, the executing comprising:

decrypting the received encrypted secrets using decryption keys of the boot loader;

storing the decrypted secrets in a storage accessible by the application;

creating a proof record indicating the application, the decrypted secrets, and the trusted execution environment;

storing the proof record in the storage;

deleting the decryption keys;

executing the application in the trusted execution environment using the decrypted secrets; and providing the proof record by the application for proving authenticity.

14. The computer program product of claim 13, wherein the trusted execution environment comprises one or more virtual machines, and wherein the computer system is configured to protect memory data of the one or more virtual machines.

15. A computer system comprising:

one or more computer processors;

one or more computer-readable storage media;

program instructions stored on the computer-readable storage media for execution by at least one of the one or more processors, the program instructions comprising instructions to:

receive encrypted secrets, the encrypted secrets enabling access to resources by an application; and execute a bootloader in a trusted execution environment of a host computer system, the executing comprising:

decrypting the received encrypted secrets using decryption keys of the boot loader;

storing the decrypted secrets in a storage accessible by the application;

creating a proof record indicating the application, the decrypted secrets, and the trusted execution environment;

storing the proof record in the storage;

deleting the decryption keys;

executing the application in the trusted execution environment using the decrypted secrets; and providing the proof record by the application for proving authenticity.

16. The computer system of claim 15, wherein the trusted execution environment comprises one or more virtual machines, wherein the computer system is configured to protect memory data of the one or more virtual machines.

17. The computer system of claim 15, wherein the bootloader is encrypted, and wherein the computer system is further configured for decrypting the bootloader.

18. The computer system of claim 17, wherein receiving the secrets comprises receiving a nonce, wherein the proof record comprises the nonce, a hash value of the secrets, a hash value of the application, application parameters and data indicative of the trusted execution environment.

19. The computer system of claim 15, wherein the decryption keys are embedded in the bootloader, and wherein the end of the execution of the bootloader results in the deletion of the decryption keys.

20. The computer system of claim 15, wherein the application is encrypted, and wherein decrypting the secrets further comprises decrypting the application by the bootloader.

* * * * *